UNITED STATES PATENT OFFICE.

GEORGE F. BIHN AND ROBERT HEERLEIN, OF PHILADELPHIA, PENNSYLVANIA, ASSIGNORS TO THE PENNSYLVANIA SALT MANUFACTURING COMPANY, OF SAME PLACE.

MANUFACTURE OF ALUMINOUS CAKE.

SPECIFICATION forming part of Letters Patent No. 233,916, dated November 2, 1880.

Application filed July 3, 1880. (No specimens.)

*To all whom it may concern:*

Be it known that we, GEORGE F. BIHN and ROBERT HEERLEIN, both of the city and county of Philadelphia, and State of Pennsylvania, have invented an Improvement in the Manufacture of Aluminous Cake and Sulphate of Alumina, of which the following is a specification.

The object of this invention is to decolorize iron in aluminous cake or sulphate of alumina made from materials such as kaolin, bauxite, &c., by reducing it to the state of a protoxide, and at the same time render it slightly more basic than when it is manufactured by the processes commonly in use, without loss of aluminous materials. Heretofore this has been done by F. Laur by adding zinc to the ferruginous solution of sulphate of alumina. This is also done by Carl V. Petraeus by adding sulphides of alkaline earths or metallic sulphides to acid solutions of aluminous materials, and also by adding metallic lead in a state of fine powder to the aluminous solution and then boiling the same. We have, however, found that by adding such compounds as the sulphites, bisulphites, and hyposulphites of the alkalies, alkaline earths, or the metallic bases to a pasty or semi-fused mass of sulphate of alumina or aluminous cake, the iron, which there exists in the state of the peroxide and colors the solution, is reduced to the state of the protoxide, which is colorless, thereby producing a colorless solution of alum.

When the aluminous cake or sulphate of alumina is to be acted on by this process it is brought to a semi-fused state, and when in this condition we add either of the sulphites, bisulphites, or hyposulphites previously enumerated.

We do not confine ourselves to any particular time to add the reducing sulphites, &c.; but in practice we prefer to add them to the ferruginous semi-fused mass of aluminous materials or sulphate of alumina at or about the same time at which the reducing chemicals are added in other processes.

In the manufacture of aluminous cake we prefer to add the sulphites, bisulphites, and hyposulphites to the semi-fused mass of bauxite or other material containing alumina and sulphuric acid at or about the time the reaction of the acid upon the clay ceases or is about to cease.

The addition of the sulphites, bisulphites, and hyposulphites to the aluminous cake in a semi-fused condition causes the disengagement of sulphurous acid in the nascent state and in contact with the iron peroxide, in which condition it combines with part of the oxygen of the peroxide of iron to form sulphuric acid, which remains in the product, while the peroxide of iron is reduced to the state of protoxide, which is colorless.

Having now described our invention, what we claim as new, and desire to secure by Letters Patent, is—

The herein-described process for manufacturing a white aluminous cake from ferruginous aluminous sulphate by treating the aluminous sulphate in the semi-fused condition with sulphites, bisulphites, or hyposulphites of the alkalies, alkaline earths, or the metallic bases, substantially as herein set forth.

In testimony of which invention we hereunto set our hands.

GEORGE F. BIHN.
ROBERT HEERLEIN.

Witnesses:
R. M. HUNTER,
ROBT. A. CAVIN.